US011929506B2

United States Patent
Akabane et al.

(10) Patent No.: US 11,929,506 B2
(45) Date of Patent: Mar. 12, 2024

(54) BINDER COMPOSITION FOR NON-AQUEOUS SECONDARY BATTERY, SLURRY COMPOSITION FOR NON-AQUEOUS SECONDARY BATTERY FUNCTIONAL LAYER, FUNCTIONAL LAYER FOR NON-AQUEOUS SECONDARY BATTERY, BATTERY MEMBER FOR NON-AQUEOUS SECONDARY BATTERY, AND NON-AQUEOUS SECONDARY BATTERY

(71) Applicant: ZEON CORPORATION, Tokyo (JP)

(72) Inventors: Tetsuya Akabane, Tokyo (JP); Hiroto Kidokoro, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 791 days.

(21) Appl. No.: 16/976,076

(22) PCT Filed: Feb. 27, 2019

(86) PCT No.: PCT/JP2019/007612
§ 371 (c)(1),
(2) Date: Aug. 27, 2020

(87) PCT Pub. No.: WO2019/172049
PCT Pub. Date: Sep. 12, 2019

(65) Prior Publication Data
US 2020/0403243 A1    Dec. 24, 2020

(30) Foreign Application Priority Data

Mar. 7, 2018    (JP) .................................. 2018-040486

(51) Int. Cl.
| | | |
|---|---|---|
| *H01M 4/62* | (2006.01) | |
| *C08K 3/04* | (2006.01) | |
| *C08K 3/34* | (2006.01) | |
| *C08K 3/36* | (2006.01) | |
| *C08L 53/00* | (2006.01) | |
| *C08L 53/02* | (2006.01) | |
| *H01M 4/36* | (2006.01) | |
| *H01M 10/0525* | (2010.01) | |

(52) U.S. Cl.
CPC .............. *H01M 4/622* (2013.01); *C08K 3/04* (2013.01); *C08L 53/005* (2013.01); *C08L 53/02* (2013.01); *H01M 4/366* (2013.01); *H01M 10/0525* (2013.01)

(58) Field of Classification Search
CPC .. H01M 4/622; H01M 4/366; H01M 10/0525; H01M 4/0404; H01M 4/13; H01M 4/139; H01M 10/052; C08K 3/04; C08L 53/005; C08L 53/02; Y02E 60/10

See application file for complete search history.

(56) References Cited

U.S. PATENT DOCUMENTS

| | | |
|---|---|---|
| 10,784,502 B2 | 9/2020 | Yamamoto et al. |
| 2015/0086875 A1 | 3/2015 | Yoshida |
| 2018/0151866 A1 | 5/2018 | Yamamoto et al. |
| 2019/0044147 A1 | 2/2019 | Yamamoto |

FOREIGN PATENT DOCUMENTS

| | | | | |
|---|---|---|---|---|
| CN | 102714317 A | | 10/2012 | |
| CN | 104471762 A | * | 3/2015 | ........ H01M 10/0525 |
| CN | 105900270 A | | 8/2016 | |
| CN | 107534131 A | | 1/2018 | |
| JP | 2013206598 A | * | 10/2013 | .......... H01M 10/052 |
| KR | 20180083340 A | * | 7/2018 | ............ H01M 4/139 |
| TW | 201319153 A | * | 5/2013 | ............ C08F 293/00 |
| WO | 2011086983 A1 | | 7/2011 | |
| WO | WO-2013084990 A1 | * | 6/2013 | .......... H01M 4/0404 |
| WO | 2013147007 A1 | | 10/2013 | |
| WO | 2014181714 A1 | | 11/2014 | |
| WO | WO-2015046173 A1 | * | 4/2015 | ........ H01M 10/0569 |
| WO | 2015107896 A1 | | 7/2015 | |
| WO | 2016199353 A1 | | 12/2016 | |
| WO | 2017056404 A1 | | 4/2017 | |

OTHER PUBLICATIONS

Jan. 19, 2022, the Extended European Search Report issued by the European Patent Office in the corresponding European Patent Application No. 19763159.1.
Sep. 8, 2020, International Preliminary Report on Patentability issued in the International Patent Application No. PCT/JP2019/007612.
Apr. 16, 2019, International Search Report issued in the International Patent Application No. PCT/JP2019/007612.

\* cited by examiner

*Primary Examiner* — Kaity V Chandler
(74) *Attorney, Agent, or Firm* — KENJA IP LAW PC

(57) ABSTRACT

Provided is a binder composition for a non-aqueous secondary battery containing: a particulate polymer formed of a block copolymer including an aliphatic conjugated diene monomer unit and a block region formed of an aromatic vinyl monomer unit; at least one saturated hydrocarbon selected from the group consisting of a chain alkane having a carbon number of not less than 5 and not more than 8 and a cycloalkane having a carbon number of not less than 5 and not more than 8; and water. The content of the saturated hydrocarbon is not less than 0.001 parts by mass and not more than 0.1 parts by mass per 100 parts by mass of the particulate polymer.

8 Claims, No Drawings

BINDER COMPOSITION FOR NON-AQUEOUS SECONDARY BATTERY, SLURRY COMPOSITION FOR NON-AQUEOUS SECONDARY BATTERY FUNCTIONAL LAYER, FUNCTIONAL LAYER FOR NON-AQUEOUS SECONDARY BATTERY, BATTERY MEMBER FOR NON-AQUEOUS SECONDARY BATTERY, AND NON-AQUEOUS SECONDARY BATTERY

TECHNICAL FIELD

The present disclosure relates to a binder composition for a non-aqueous secondary battery, a slurry composition for a non-aqueous secondary battery functional layer, a functional layer for a non-aqueous secondary battery, a battery member for a non-aqueous secondary battery, and a non-aqueous secondary battery.

BACKGROUND

Non-aqueous secondary batteries (hereinafter, also referred to simply as "secondary batteries") such as lithium ion secondary batteries have characteristics such as compact size, light weight, high energy density, and the ability to be repeatedly charged and discharged, and are used in a wide variety of applications. A secondary battery typically includes battery members such as electrodes (positive electrode and negative electrode) and a separator that isolates the positive electrode and the negative electrode from one another.

There are instances in which a battery member that includes a functional layer containing a binder and optionally containing particles compounded in order to cause the battery member to display a desired function (hereinafter, referred to as "functional particles") is used as a battery member of a secondary battery.

Specifically, a separator that includes an adhesive layer containing a binder and/or a porous membrane layer containing a binder and non-conductive particles as functional particles on a separator substrate may be used as a separator of a secondary battery. Moreover, an electrode that includes an electrode mixed material layer containing a binder and electrode active material particles as functional particles on a current collector or an electrode that further includes an adhesive layer and/or a porous membrane layer such as described above on an electrode substrate including an electrode mixed material layer on a current collector may be used as an electrode of a secondary battery.

A battery member including a functional layer such as described above is formed by, for example, applying a slurry composition containing functional particles, a binder-containing binder composition, and so forth onto a separator substrate, a current collector, or an electrode substrate, and then drying the applied slurry composition.

Attempts have been made to improve binder compositions used in functional layer formation in recent years in order to achieve further improvement of secondary battery performance.

In one specific example, Patent Literature (PTL) 1 discloses a binder composition for a non-aqueous secondary battery electrode containing, in a specific proportion, a particulate block copolymer that includes a block region formed of an aliphatic conjugated diene monomer unit and a block region formed of an aromatic vinyl monomer unit. PTL 1 discloses that by using this binder composition for a non-aqueous secondary battery electrode, it is possible to provide an electrode for a non-aqueous secondary battery having excellent peel strength and a non-aqueous secondary battery having excellent cycle characteristics.

CITATION LIST

Patent Literature

PTL 1: WO2017/056404A1

SUMMARY

Technical Problem

In the production process of a secondary battery, an electrode and a separator that have not yet been immersed in electrolyte solution may be pressure bonded to obtain a laminate, and may be cut to a desired size as necessary and transported in the form of a laminate. During such cutting or transportation, the pressure bonded electrode and separator may become misaligned, leading to problems such as the occurrence of faults and reduction of productivity. For this reason, there is demand for battery members (electrodes and separators) of secondary batteries to display high adhesiveness even in a state prior to immersion in electrolyte solution (i.e., process adhesiveness).

However, a battery member including a functional layer that is formed using the conventional binder composition described above leaves room for improvement in terms of further improving process adhesiveness.

The conventional binder composition described above also leaves room for improvement in terms that the particulate block copolymer used as a binder readily crystallizes, and cycle characteristics of a secondary battery produced using the binder composition tend to deteriorate.

Accordingly, one object of the present disclosure is to provide a binder composition for a non-aqueous secondary battery, a slurry composition for a non-aqueous secondary battery functional layer, and a functional layer for a non-aqueous secondary battery that can form a battery member for a non-aqueous secondary battery having excellent process adhesiveness and a non-aqueous secondary battery having excellent cycle characteristics.

Another object of the present disclosure is to provide a battery member for a non-aqueous secondary battery that displays excellent process adhesiveness and can form a non-aqueous secondary battery having excellent cycle characteristics, and also to provide a non-aqueous secondary battery that has excellent cycle characteristics.

Solution to Problem

The inventors conducted diligent investigation with the aim of solving the problems set forth above. The inventors discovered that when a specific saturated hydrocarbon is contained in a specific proportion in an aqueous binder composition that contains a particulate polymer formed of a block copolymer including an aliphatic conjugated diene monomer unit and a block region formed of an aromatic vinyl monomer unit, it is possible to form a battery member for a non-aqueous secondary battery having excellent process adhesiveness and a non-aqueous secondary battery having excellent cycle characteristics. In this manner, the inventors completed the present disclosure.

Specifically, the present disclosure aims to advantageously solve the problems set forth above, and a presently disclosed binder composition for a non-aqueous secondary battery comprises: a particulate polymer formed of a block copolymer including an aliphatic conjugated diene monomer unit and a block region formed of an aromatic vinyl monomer unit; at least one saturated hydrocarbon selected from the group consisting of a chain alkane having a carbon number of not less than 5 and not more than 8 and a cycloalkane having a carbon number of not less than 5 and not more than 8; and water, wherein content of the saturated hydrocarbon is not less than 0.001 parts by mass and not more than 0.1 parts by mass per 100 parts by mass of the particulate polymer. By using an aqueous binder composition that contains a particulate polymer formed of a specific block copolymer and a specific saturated hydrocarbon in specific proportions in this manner, it is possible to form a battery member having excellent process adhesiveness and a secondary battery having excellent cycle characteristics.

Note that a "monomer unit" of a polymer referred to in the present disclosure is a "repeating unit derived from the monomer that is included in a polymer obtained using the monomer".

Moreover, when a polymer is said to "include a block region formed of a monomer unit" in the present disclosure, this means that "a section where only monomer units of that type are bonded to one another in a row as repeating units is present in the polymer".

Furthermore, the "content of a saturated hydrocarbon" referred to in the present disclosure can be measured by a measurement method described in the EXAMPLES section of the present specification.

In the presently disclosed binder composition for a non-aqueous secondary battery, the particulate polymer preferably has a surface acid content of not less than 0.05 mmol/g and not more than 2.00 mmol/g. When the surface acid content of the particulate polymer is within the range set forth above, dispersibility of a slurry composition in which the binder composition is used can be increased, and process adhesiveness of a battery member formed using the binder composition can be further increased.

The "surface acid content" of a particulate polymer referred to in the present disclosure is the surface acid content per 1 g of solid content of the particulate polymer and can be measured by a measurement method described in the EXAMPLES section of the present specification.

In the presently disclosed binder composition for a non-aqueous secondary battery, the block copolymer can include a coupling moiety.

Note that a "coupling moiety" in a polymer referred to in the present disclosure is a "moiety derived from a coupling agent that is included in a polymer obtained through a coupling reaction using the coupling agent".

Moreover, the present disclosure aims to advantageously solve the problems set forth above, and a presently disclosed slurry composition for a non-aqueous secondary battery functional layer comprises any one of the binder compositions for a non-aqueous secondary battery set forth above. Through inclusion of the binder composition set forth above in this manner, it is possible to form a battery member having excellent process adhesiveness and a secondary battery having excellent cycle characteristics.

The presently disclosed slurry composition for a non-aqueous secondary battery functional layer can further comprise electrode active material particles. By using the slurry composition for a non-aqueous secondary battery functional layer containing electrode active material particles as functional particles to form an electrode mixed material layer, it is possible to produce an electrode having excellent process adhesiveness.

Moreover, the presently disclosed slurry composition for a non-aqueous secondary battery functional layer can further comprise non-conductive particles. By using the slurry composition for a non-aqueous secondary battery functional layer containing non-conductive particles as functional particles to form a porous membrane layer, it is possible to produce a battery member (separator or electrode) having excellent process adhesiveness.

Furthermore, the present disclosure aims to advantageously solve the problems set forth above, and a presently disclosed functional layer for a non-aqueous secondary battery is formed using any one of the slurry compositions for a non-aqueous secondary battery functional layer set forth above. By using a functional layer formed using the slurry composition set forth above, it is possible to form a battery member having excellent process adhesiveness and a secondary battery having excellent cycle characteristics.

Also, the present disclosure aims to advantageously solve the problems set forth above, and a presently disclosed battery member for a non-aqueous secondary battery comprises the functional layer for a non-aqueous secondary battery set forth above. A battery member, such as a separator or an electrode, that includes the functional layer set forth above has excellent process adhesiveness and can cause a secondary battery to display excellent cycle characteristics.

Moreover, the present disclosure aims to advantageously solve the problems set forth above, and a presently disclosed non-aqueous secondary battery comprises the battery member for a non-aqueous secondary battery set forth above. A secondary battery that includes the battery member for a non-aqueous secondary battery set forth above can display excellent cycle characteristics.

Advantageous Effect

According to the present disclosure, a binder composition for a non-aqueous secondary battery, a slurry composition for a non-aqueous secondary battery functional layer, and a functional layer for a non-aqueous secondary battery that can form a battery member for a non-aqueous secondary battery having excellent process adhesiveness and a non-aqueous secondary battery having excellent cycle characteristics are obtained.

Moreover, according to the present disclosure, a battery member for a non-aqueous secondary battery that displays excellent process adhesiveness and can form a non-aqueous secondary battery having excellent cycle characteristics is obtained.

Furthermore, according to the present disclosure, a non-aqueous secondary battery having excellent cycle characteristics is obtained.

DETAILED DESCRIPTION

The following provides a detailed description of embodiments of the present disclosure.

The presently disclosed binder composition for a non-aqueous secondary battery is a composition that is used in production of a non-aqueous secondary battery and can be used, for example, in production of the presently disclosed slurry composition for a non-aqueous secondary battery functional layer. The presently disclosed slurry composition for a non-aqueous secondary battery functional layer can be used in formation of any functional layer (for example, an electrode mixed material layer, porous membrane layer, or adhesive layer) that has a function such as giving and receiving electrons, reinforcement, or adhesion inside a non-aqueous secondary battery. Moreover, the presently disclosed functional layer for a non-aqueous secondary battery is formed from the presently disclosed slurry composition for a non-aqueous secondary battery functional layer. Furthermore, the presently disclosed battery member for a non-aqueous secondary battery is an electrode or a separator, for example, and includes the presently disclosed functional layer for a non-aqueous secondary battery. The presently disclosed non-aqueous secondary battery includes the presently disclosed battery member for a non-aqueous secondary battery.

(Binder Composition for Non-Aqueous Secondary Battery)

The presently disclosed binder composition contains a particulate polymer, a saturated hydrocarbon, and an aqueous medium, and optionally further contains other components that can be compounded in binder compositions.

In the presently disclosed binder composition, the particulate polymer is formed of a block copolymer including an aliphatic conjugated diene monomer unit and a block region formed of an aromatic vinyl monomer unit, and the content of at least one saturated hydrocarbon selected from the group consisting of a chain alkane having a carbon number of not less than 5 and not more than 8 and a cycloalkane having a carbon number of not less than 5 and not more than 8 is not less than 0.001 parts by mass and not more than 0.1 parts by mass per 100 parts by mass of the particulate polymer. Consequently, it is possible to form a battery member having excellent process adhesiveness and a secondary battery having excellent cycle characteristics through the presently disclosed binder composition.

<Particulate Polymer>

The particulate polymer is a component that functions as a binder and, in a functional layer formed using a slurry composition containing the binder composition, holds components such as functional particles so that these components do not become detached from the functional layer and enables adhesion of battery members via the functional layer.

The particulate polymer is water-insoluble particles that are formed of a specific block copolymer. Note that when particles are referred to as "water-insoluble" in the present disclosure, this means that 0.5 g of polymer is dissolved in 100 g of water at a temperature of 25° C., insoluble content is 90 mass % or more.

[Block Copolymer]

The block copolymer forming the particulate polymer is a copolymer that includes a block region formed of an aromatic vinyl monomer unit (hereinafter, also referred to simply as the "aromatic vinyl block region") and a macromolecule chain section where repeating units other than aromatic vinyl monomer units are linked (hereinafter, also referred to simply as the "other region"), and in which the other region includes at least an aliphatic conjugated diene monomer unit. The aromatic vinyl block region and the other region are adjacent to one another in the block copolymer. The block copolymer may include just one aromatic vinyl block region or may include a plurality of aromatic vinyl block regions. Likewise, the block copolymer may include just one other region or may include a plurality of other regions.

—Aromatic Vinyl Block Region—

The aromatic vinyl block region is a region that only includes an aromatic vinyl monomer unit as a repeating unit as previously described.

A single aromatic vinyl block region may be formed of just one type of aromatic vinyl monomer unit or may be formed of a plurality of types of aromatic vinyl monomer units, but is preferably formed of just one type of aromatic vinyl monomer unit.

Moreover, a single aromatic vinyl block region may include a coupling moiety (i.e., aromatic vinyl monomer units forming a single aromatic vinyl block region may be linked to one another with a coupling moiety interposed therebetween).

In a case in which the block copolymer includes a plurality of aromatic vinyl block regions, the types and proportions of aromatic vinyl monomer units forming these aromatic vinyl block regions may be the same or different for each of the aromatic vinyl block regions, but are preferably the same.

Examples of aromatic vinyl monomers that can form an aromatic vinyl monomer unit of the aromatic vinyl block region in the block copolymer include aromatic monovinyl compounds such as styrene, styrene sulfonic acid and salts thereof, α-methylstyrene, p-t-butylstyrene, butoxystyrene, vinyltoluene, chlorostyrene, and vinylnaphthalene. Of these aromatic vinyl monomers, styrene is preferable. Although one of these aromatic vinyl monomers may be used individually or two or more of these aromatic vinyl monomers may be used in combination, it is preferable that one of these aromatic vinyl monomers is used individually.

The proportion constituted by the aromatic vinyl monomer unit in the block copolymer when the amount of all repeating units in the block copolymer (monomer units and structural units; inclusive of repeating units of a graft portion in a case in which the block copolymer includes a graft portion) is taken to be 100 mass % is preferably 5 mass % or more, more preferably 10 mass % or more, and even more preferably 15 mass % or more, and is preferably 50 mass % or less, more preferably 45 mass % or less, and even more preferably 40 mass % or less. When the proportion constituted by the aromatic vinyl monomer unit in the block copolymer is 5 mass % or more, expression of tackiness by the block copolymer can be suppressed, and handleability of a battery member can be improved. On the other hand, when the proportion constituted by the aromatic vinyl monomer unit in the block copolymer is 50 mass % or less, flexibility of the block copolymer is ensured, and process adhesiveness of a battery member can be further improved.

Note that the proportion constituted by the aromatic vinyl monomer unit in the block copolymer is normally the same as the proportion constituted by the aromatic vinyl block region in the block copolymer.

—Other Region—

The other region is a region that only includes a repeating unit other than an aromatic vinyl monomer unit (hereinafter, also referred to simply as the "other repeating unit") as a repeating unit as previously described. The other region includes at least an aliphatic conjugated diene monomer unit.

A single other region may be formed of one type of other repeating unit or may be formed of a plurality of types of other repeating units.

Moreover, a single other region may include a coupling moiety (i.e., other repeating units forming a single other region may be linked to one another with a coupling moiety interposed therebetween).

Moreover, the other region may include a graft portion and/or a cross-linked structure.

In a case in which the block copolymer includes a plurality of other regions, the types and proportions of other repeating units forming these other regions may be the same or different for each of the other regions. Note that in a case in which the block copolymer includes a plurality of other regions, at least one of the other regions includes an aliphatic conjugated diene monomer unit.

—Aliphatic Conjugated Diene Monomer Unit—

Examples of aliphatic conjugated diene monomers that can form an aliphatic conjugated diene monomer unit of the other region include conjugated diene compounds having a carbon number of 4 or more such as 1,3-butadiene, isoprene, 2,3-dimethyl-1,3-butadiene, and 1,3-pentadiene. One of these aliphatic conjugated diene monomers may be used individually, or two or more of these aliphatic conjugated diene monomers may be used in combination. Of these aliphatic conjugated diene monomers, 1,3-butadiene and isoprene are preferable from a viewpoint of further improving process adhesiveness of a battery member.

The proportion constituted by the aliphatic conjugated diene monomer unit in the block copolymer when the amount of all repeating units in the block copolymer is taken to be 100 mass % is preferably 50 mass % or more, and more preferably 65 mass % or more, and is preferably 98 mass % or less, and more preferably 95 mass % or less. When the proportion constituted by the aliphatic conjugated diene monomer unit in the block copolymer is 50 mass % or more, process adhesiveness of a battery member can be further improved. On the other hand, when the proportion constituted by the aliphatic conjugated diene monomer unit in the block copolymer is 98 mass % or less, expression of tackiness by the block copolymer can be suppressed, and handleability of a battery member can be improved.

Examples of repeating units other than the aliphatic conjugated diene monomer unit that can be other repeating units of the other region include, but are not specifically limited to, an alkylene structural unit and a structural unit obtained through cross-linking of an aliphatic conjugated diene monomer unit.

—Alkylene Structural Unit—

The alkylene structural unit is a repeating unit composed only of an alkylene structure represented by a general formula —$C_nH_{2n}$— (n is an integer of 2 or more).

Although the alkylene structural unit may be linear or branched, the alkylene structural unit is preferably linear (i.e., is preferably a linear alkylene structural unit). The carbon number of the alkylene structural unit is preferably 4 or more (i.e., n in the preceding general formula is preferably an integer of 4 or more).

No specific limitations are placed on the method by which the alkylene structural unit is introduced into the block copolymer. For example, a method in which a polymer is produced from a monomer composition containing an aliphatic conjugated diene monomer and then the polymer is hydrogenated to convert an aliphatic conjugated diene monomer unit to an alkylene structural unit and thereby obtain the block copolymer is preferable because it is easy to produce the block copolymer.

The aliphatic conjugated diene monomer used in the above-described method may be any of the conjugated diene compounds having a carbon number of 4 or more that were previously described as aliphatic conjugated diene monomers that can form an aliphatic conjugated diene monomer unit, and is preferably isoprene. In other words, the alkylene structural unit is preferably a structural unit obtained through hydrogenation of an aliphatic conjugated diene monomer unit (i.e., is preferably a hydrogenated aliphatic conjugated diene unit), and is more preferably a structural unit obtained through hydrogenation of an isoprene unit (i.e., is more preferably a hydrogenated isoprene unit). Selective hydrogenation of an aliphatic conjugated diene monomer unit can be carried out by a commonly known method such as an oil-layer hydrogenation method or a water-layer hydrogenation method.

—Structural Unit Obtained Through Cross-Linking of Aliphatic Conjugated Diene Monomer Unit—

The structural unit obtained through cross-linking of an aliphatic conjugated diene monomer unit can be introduced into the polymer through cross-linking of a block copolymer that includes an aliphatic conjugated diene monomer unit and a block region formed of an aromatic vinyl monomer unit.

The cross-linking can be performed without any specific limitations using a radical initiator such as a redox initiator that is a combination of an oxidizing agent and a reducing agent, for example. Examples of oxidizing agents that can be used include organic peroxides such as diisopropylbenzene hydroperoxide, cumene hydroperoxide, t-butyl hydroperoxide, 1,1,3,3-tetramethylbutyl hydroperoxide, di-t-butyl peroxide, isobutyryl peroxide, and benzoyl peroxide. Examples of reducing agents that can be used include compounds including a metal ion in a reduced state such as ferrous sulfate and copper naphthenate; sulfonic acid compounds such as sodium methanesulfonate; and amine compounds such as dimethylaniline. One of these organic peroxides and reducing agents may be used individually, or two or more of these organic peroxides and reducing agents may be used in combination.

Also note that the cross-linking may be carried out in the presence of a cross-linker such as a polyvinyl compound (divinylbenzene, etc.), a polyallyl compound (diallyl phthalate, triallyl trimellitate, diethylene glycol bis(allyl carbonate), etc.), or a glycol (ethylene glycol diacrylate, etc.). Moreover, the cross-linking can be performed by irradiation with active energy rays such as γ-rays.

The total amount of an aliphatic conjugated diene monomer unit, a structural unit obtained through cross-linking of an aliphatic conjugated diene monomer unit, and an alkylene structural unit in the block copolymer forming the particulate polymer when the amount of all repeating units in the block copolymer is taken to be 100 mass % is preferably 50 mass % or more, and more preferably 65 mass % or more, and is preferably 98 mass % or less, and more preferably 95 mass % or less. When the total proportion constituted by an aliphatic conjugated diene monomer unit, a structural unit obtained through cross-linking of an aliphatic conjugated diene monomer unit, and an alkylene structural unit in the block copolymer is 50 mass % or more, process adhesiveness of a battery member can be further improved. On the other hand, when the total proportion constituted by an aliphatic conjugated diene monomer unit, a structural unit obtained through cross-linking of an aliphatic conjugated diene monomer unit, and an alkylene structural unit in the block copolymer is 98 mass % or less, expression of tackiness by the block copolymer can be suppressed, and handleability of a battery member can be improved.

—Graft Portion—

The other region of the block copolymer may include a graft portion. In other words, the block copolymer may have a structure in which a polymer that forms a graft portion is bonded to a polymer that forms a backbone portion.

Examples of repeating units that can be included in the graft portion of the block copolymer include, but are not specifically limited to, nitrile group-containing monomer units such as an acrylonitrile unit and a methacrylonitrile unit; (meth)acrylic acid ester monomer units such as acrylic acid alkyl ester units and methacrylic acid alkyl ester units; and acidic group-containing monomer units such as carboxyl group-containing monomer units, sulfo group-containing monomer units, and phosphate group-containing monomer units. In the present disclosure, "(meth)acrylic acid" is used to indicate "acrylic acid" and/or "methacrylic acid".

Of the monomer units described above, an acidic group-containing monomer unit is preferable as a repeating unit included in the graft portion. Examples of acidic group-containing monomers that can form the acidic group-containing monomer unit include carboxyl group-containing monomers, sulfo group-containing monomers, and phosphate group-containing monomers.

Examples of carboxyl group-containing monomers include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, and α-chloro-β-E-methoxyacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid monoesters such as nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

An acid anhydride that produces a carboxyl group through hydrolysis can also be used as a carboxyl group-containing monomer.

Examples of sulfo group-containing monomers include styrene sulfonic acid, vinyl sulfonic acid (ethylene sulfonic acid), methyl vinyl sulfonic acid, (meth)allyl sulfonic acid, and 3-allyloxy-2-hydroxypropane sulfonic acid.

Note that in the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

Note that in the present disclosure, "(meth)acryloyl" is used to indicate "acryloyl" and/or "methacryloyl".

One of the monomers described above for forming a repeating unit included in the graft portion of the block copolymer may be used individually, or two or more of these monomers may be used in combination. Of these monomers, an acidic group-containing monomer such as described above is preferable, methacrylic acid or acrylic acid is more preferable, and methacrylic acid is even more preferable as a monomer forming a repeating unit included in the graft portion of the block copolymer.

No specific limitations are placed on the method by which the graft portion is introduced into the block copolymer. For example, a polymer including an aromatic vinyl block region and another region including an aliphatic conjugated diene monomer unit may be produced, and graft polymerization of an acidic group-containing monomer such as described above, or the like, may be performed by a known method with the produced polymer as a backbone portion to thereby obtain a block copolymer having a structure in which a polymer of a graft portion is bonded to an aliphatic conjugated diene monomer unit of the polymer of the backbone portion.

The graft polymerization can be performed by a known graft polymerization method without any specific limitations. Specifically, the graft polymerization can be carried out using a radical initiator such as a redox initiator that is a combination of an oxidizing agent and a reducing agent. The oxidizing agent and the reducing agent can be any of the same oxidizing agents and reducing agents as previously described as oxidizing agents and reducing agents that can be used in cross-linking of a block copolymer including an aliphatic conjugated diene monomer unit and a block region formed of an aromatic vinyl monomer unit.

In a case in which graft polymerization is performed with respect to a block copolymer including an aliphatic conjugated diene monomer unit and a block region formed of an aromatic vinyl monomer unit using a redox initiator, introduction of another monomer unit by graft polymerization and cross-linking of an aliphatic conjugated diene monomer unit can be caused to proceed concurrently. Note that it is not essential that graft polymerization and cross-linking proceed concurrently, and the type of radical initiator and the reaction conditions may be adjusted such that only graft polymerization proceeds.

In a case in which the block copolymer includes a graft portion, the proportion constituted by the graft portion in the block copolymer when the amount of all repeating units in the block copolymer is taken to be 100 mass % is preferably 0.1 mass % or more, more preferably 0.5 mass % or more, and even more preferably 1 mass % or more, and is preferably 20 mass % or less, more preferably 18 mass % or less, and even more preferably 15 mass % or less.

[Surface Acid Content]

The surface acid content of the particulate polymer is preferably 0.05 mmol/g or more, more preferably 0.08 mmol/g or more, and even more preferably 0.10 mmol/g or more, and is preferably 2.00 mmol/g or less, more preferably 1.50 mmol/g or less, and even more preferably 1.30 mmol/g or less. When the surface acid content of the particulate polymer is not less than any of the lower limits set forth above, aggregation of a slurry composition produced using the binder composition can be inhibited, and a slurry composition having excellent dispersibility can be obtained. Moreover, when the surface acid content of the particulate polymer is not more than any of the upper limits set forth above, pressability of a functional layer formed using the binder composition can be increased.

[Production Method of Particulate Polymer]

The particulate polymer formed of the block copolymer including an aliphatic conjugated diene monomer unit and an aromatic vinyl block region can be produced, for example, through a step of block polymerizing the above-described monomers in an organic solvent to obtain a solution of a block copolymer (block copolymer solution production step), a step of adding water to the obtained solution of the block copolymer and performing emulsification to form particles of the block copolymer (emulsification step), and, as an optionally implemented step, a step of performing graft polymerization with respect to the block copolymer particles to obtain a water dispersion of a particulate polymer formed of a block copolymer (grafting step).

Note that the grafting step may be performed before the emulsification step in production of the particulate polymer. In other words, the particulate polymer may be produced by, after the block copolymer solution production step, implementing a step of performing graft polymerization with respect to the block copolymer contained in the obtained solution of the block copolymer to obtain a solution of a block copolymer (grafting step) and a step of subsequently adding water to the obtained solution of the block copolymer and performing emulsification to form particles of the block copolymer (emulsification step).

—Block Copolymer Solution Production Step—

No specific limitations are placed on the method of block polymerization in the block copolymer solution production step. For example, a block copolymer can be produced by polymerizing a first monomer component, adding a second monomer component, differing from the first monomer component, to the resultant solution and performing polymerization thereof, and further repeating addition and polymerization of monomer components as necessary. The organic solvent used as the reaction solvent is not specifically limited and can be selected as appropriate depending on the types of monomers and so forth. Specific examples of organic solvents that can be used include, but are not specifically limited to, chain alkanes having a carbon number of not less than 5 and not more than 8 such as n-pentane, n-hexane, n-heptane, and n-octane, cycloalkanes having a carbon number of not less than 5 and not more than 8 such as cyclopentane, cyclohexane, cycloheptane, and cyclooctane, and mixtures thereof.

The block copolymer obtained through block polymerization as described above is preferably subjected to a coupling reaction using a coupling agent in advance of the subsequently described emulsification step. The coupling reaction can, for example, cause the terminals of diblock structures contained in the block copolymer to bond to one another through the coupling agent to thereby convert the diblock structures to a triblock structure (i.e., the diblock content can be reduced).

Examples of coupling agents that can be used in the coupling reaction include, without any specific limitations, difunctional coupling agents, trifunctional coupling agents, tetrafunctional coupling agents, and coupling agents having a functionality of 5 or higher.

Examples of difunctional coupling agents include difunctional halosilanes such as dichlorosilane, monomethyldichlorosilane, and dichlorodimethylsilane; difunctional haloalkanes such as dichloroethane, dibromoethane, methylene chloride, and dibromomethane; and difunctional tin halides such as tin dichloride, monomethyltin dichloride, dimethyltin dichloride, monoethyltin dichloride, diethyltin dichloride, monobutyltin dichloride, and dibutyltin dichloride.

Examples of trifunctional coupling agents include trifunctional haloalkanes such as trichloroethane and trichloropropane; trifunctional halosilanes such as methyltrichlorosilane and ethyltrichlorosilane; and trifunctional alkoxysilanes such as methyltrimethoxysilane, phenyltrimethoxysilane, and phenyltriethoxysilane.

Examples of tetrafunctional coupling agents include tetrafunctional haloalkanes such as carbon tetrachloride, carbon tetrabromide, and tetrachloroethane; tetrafunctional halosilanes such as tetrachlorosilane and tetrabromosilane; tetrafunctional alkoxysilanes such as tetramethoxysilane and tetraethoxysilane; and tetrafunctional tin halides such as tin tetrachloride and tin tetrabromide.

Examples of coupling agents having a functionality of 5 or higher include 1,1,1,2,2-pentachloroethane, perchloroethane, pentachlorobenzene, perchlorobenzene, octabromodiphenyl ether, and decabromodiphenyl ether.

One of these coupling agents may be used individually, or two or more of these coupling agents may be used in combination.

Of these coupling agents, dichlorodimethylsilane is preferable. Note that through the coupling reaction using a coupling agent, a coupling moiety derived from the coupling agent is introduced into a macromolecule chain (for example, a triblock structure) of the block copolymer.

The solution of a block copolymer obtained after the block polymerization and the optional coupling reaction described above may be subjected to the subsequently described emulsification step as obtained. Alternatively, the solution of the block copolymer can be subjected to the emulsification step after the block copolymer is subjected to the previously described hydrogenation, for example, as necessary.

—Emulsification Step—

Although no specific limitations are placed on the method of emulsification in the emulsification step, a method involving emulsification of a preliminary mixture of the solution of the block copolymer obtained in the block copolymer solution production step described above and an aqueous solution of an emulsifier, for example, is preferable. The emulsification can be carried out, for example, using a known emulsifier and a known emulsifying and dispersing device. Specific examples of emulsifying and dispersing devices that can be used include, but are not specifically limited to, batch emulsifying and dispersing devices such as a Homogenizer (product name; produced by IKA), a Polytron (product name; produced by Kinematica AG), and a TK Auto Homo Mixer (product name; produced by Tokushu Kika Kogyo Co., Ltd.); continuous emulsifying and dispersing devices such as a TK Pipeline-Homo Mixer (product name; produced by Tokushu Kika Kogyo Co., Ltd.), a Colloid Mill (product name; produced by Shinko Pantec Co., Ltd.), a Thrasher (product name; produced by Nippon Coke & Engineering Co., Ltd.), a Trigonal Wet Fine Grinding Mill (product name; produced by Mitsui Miike Chemical Engineering Machinery Co., Ltd.), a Cavitron (product name; produced by EUROTEC Ltd.), a Milder (product name; produced by Pacific Machinery & Engineering Co., Ltd.), and a Fine Flow Mill (product name; produced by Pacific Machinery & Engineering Co., Ltd.); high-pressure emulsifying and dispersing devices such as a Microfluidizer (product name; produced by Mizuho Industrial Co., Ltd.), a Nanomizer (product name; produced by Nanomizer Inc.), and an APV Gaulin (product name; produced by Gaulin); membrane emulsifying and dispersing devices such as a Membrane Emulsifier (product name; produced by Reica Co., Ltd.); vibratory emulsifying and dispersing devices such as a Vibro Mixer (product name; produced by Reica Co., Ltd.); and ultrasonic emulsifying and dispersing devices such as an Ultrasonic Homogenizer (product name; produced by Branson). The conditions (processing temperature, processing time, etc.) of the emulsifying operation performed using the emulsifying and dispersing device are not specifically limited and may be selected as appropriate so as to obtain a desired dispersion state.

A water dispersion of a particulate polymer can then be obtained by, for example, using a known method such as vacuum evaporation to remove organic solvent from the emulsion obtained after emulsification as necessary.

—Grafting Step—

Although no specific limitations are placed on the method of graft polymerization in the optionally implemented grafting step, a method in which a radical initiator such as a redox initiator is used to cause graft polymerization and cross-linking of the block copolymer to proceed concurrently in the presence of a monomer that is to be graft polymerized, for example, is preferable.

The reaction conditions can be adjusted depending on the desired chemical composition and surface acid content of the block copolymer, for example.

In the grafting step, it is possible to obtain a water dispersion of a particulate polymer formed of a block copolymer that includes a graft portion. Note that in a case in which the grafting step is performed after the emulsification step (i.e., in which graft polymerization is performed with respect to a block copolymer that has been formed into particles), a monomer unit such as an acidic group-containing monomer unit that is introduced through graft polymerization is present to a greater degree toward the surface of the particulate polymer than at the center of the particulate polymer, and thus is concentrated in a surface layer portion of the particulate polymer.

<Saturated Hydrocarbon>

The presently disclosed binder composition is required to include at least one saturated hydrocarbon selected from the group consisting of a chain alkane having a carbon number of not less than 5 and not more than 8 and a cycloalkane having a carbon number of not less than 5 and not more than 8 in a proportion of not less than 0.001 parts by mass and not more than 0.1 parts by mass per 100 parts by mass of the particulate polymer described above. In a case in which the content of the specific saturated hydrocarbon described above is less than 0.001 parts by mass per 100 parts by mass of the particulate polymer, the block copolymer forming the particulate polymer readily crystallizes, and adhesiveness of a functional layer formed using the binder composition tends to decrease over time, resulting in deterioration of cycle characteristics of a secondary battery. Moreover, in a case in which the content of the specific saturated hydrocarbon described above is more than 0.1 parts by mass per 100 parts by mass of the particulate polymer, process adhesiveness of a battery member formed using the binder composition decreases.

The chain alkane having a carbon number of not less than 5 and not more than 8 may be linear or branched, but is preferably a linear alkane having a carbon number of not less than 5 and not more than 8 such as n-pentane, n-hexane, n-heptane, or n-octane. One of these chain alkanes may be used individually, or two or more of these chain alkanes may be used as a mixture in a freely selected ratio. Of these chain alkanes having a carbon number of not less than 5 and not more than 8, n-pentane is particularly preferable.

The cycloalkane having a carbon number of not less than 5 and not more than 8 may be cyclopentane, cyclohexane, cycloheptane, cyclooctane, or the like. One of these cycloalkanes may be used individually, or two or more of these cycloalkanes may be used as a mixture in a freely selected ratio. Of these cycloalkanes having a carbon number of not less than 5 and not more than 8, cycloalkanes having a carbon number of not less than 5 and not more than 6 are preferable in terms that solubility of the block copolymer is high and process adhesiveness is improved, with cyclohexane being more preferable.

Note that just a chain alkane having a carbon number of not less than 5 and not more than 8 may be contained as the saturated hydrocarbon, just a cycloalkane having a carbon number of not less than 5 and not more than 8 may be contained as the saturated hydrocarbon, or both a chain alkane having a carbon number of not less than 5 and not more than 8 and a cycloalkane having a carbon number of not less than 5 and not more than 8 may be contained as the saturated hydrocarbon. Moreover, in a case in which the binder composition contains both a chain alkane having a carbon number of not less than 5 and not more than 8 and a cycloalkane having a carbon number of not less than 5 and not more than 8, the content ratio thereof may be a freely selected ratio. In particular, it is preferable that just a cycloalkane having a carbon number of not less than 5 and not more than 8 is include as the saturated hydrocarbon, and more preferable that just a cycloalkane having a carbon number of not less than 5 and not more than 6 is included as the saturated hydrocarbon.

The saturated hydrocarbon described above can be introduced into the binder composition by adding the saturated hydrocarbon to a water dispersion of the particulate polymer that is produced by the previously described method of producing the particulate polymer or by using the saturated hydrocarbon as an organic solvent (reaction solvent) in the previously described method of producing the particulate polymer and by only removing some of the organic solvent from the emulsion obtained after emulsification.

The content of the saturated hydrocarbon per 100 parts by mass of the particulate polymer is preferably 0.0015 parts by mass or more, more preferably 0.002 parts by mass or more, even more preferably 0.004 parts by mass or more, particularly preferably 0.01 parts by mass or more, and further preferably 0.02 parts by mass or more, and is preferably 0.06 parts by mass or less, more preferably 0.04 parts by mass or less, even more preferably 0.035 parts by mass or less, and particularly preferably 0.030 parts by mass or less. When the content of the saturated hydrocarbon is not less than any of the lower limits set forth above, crystallization of the block copolymer can be sufficiently inhibited, and cycle characteristics of a secondary battery can be further improved. Moreover, when the content of the saturated hydrocarbon is not more than any of the upper limits set forth above, process adhesiveness of a battery member formed using the binder composition can be further improved, and, in a situation in which a functional layer formed using the binder composition is pressed by a roll or the like, peeling of the functional layer and staining of the roll can be inhibited (i.e., handleability of a battery member including the functional layer can be increased).

<Aqueous Medium>

The aqueous medium contained in the presently disclosed binder composition is not specifically limited so long as it contains water, and may be an aqueous solution or a mixed solution of water and a small amount of an organic solvent.

<Other Components>

The presently disclosed binder composition can contain components other than those described above (i.e., other components). For example, the binder composition may contain a known particulate binder (styrene butadiene random copolymer, acrylic polymer, etc.) other than the previously described particulate polymer. The content of the particulate binder is preferably 70 mass % or less, more preferably 60 mass % or less, and even more preferably 40 mass % or less of the total content of the particulate polymer and the particulate binder.

The binder composition may also contain a water-soluble polymer. The water-soluble polymer is a component that can cause good dispersion of compounded components such as the previously described particulate polymer in the aqueous medium, and is preferably a synthetic macromolecule, and more preferably an addition polymer produced through addition polymerization, but is not specifically limited thereto. Also note that the water-soluble polymer may be in the form of a salt (salt of a water-soluble polymer). In other words, the term "water-soluble polymer" as used in the present disclosure is inclusive of a salt of the water-soluble polymer. When a polymer is referred to as "water-soluble" in the present disclosure, this means that when 0.5 g of the polymer is dissolved in 100 g of water at a temperature of 25° C., insoluble content is less than 1.0 mass %.

The binder composition may further contain known additives. Examples of such known additives include antioxidants such as 2,6-di-tert-butyl-p-cresol, defoamers, and dispersants (excluding those corresponding to the aforementioned water-soluble polymer). One other component may be used individually, or two or more other components may be used in combination in a freely selected ratio.

<Production Method of Binder Composition>

The presently disclosed binder composition can be produced by, without any specific limitations, mixing the particulate polymer, the saturated hydrocarbon, and the optionally used other components in the presence of the aqueous medium. Note that in a situation in which a dispersion liquid of the particulate polymer is used in production of the binder composition, liquid content of the dispersion liquid may be used as the aqueous medium of the binder composition.

(Slurry Composition for Non-Aqueous Secondary Battery Functional Layer)

The presently disclosed slurry composition is a composition that is for use in formation of a functional layer, that contains the binder composition set forth above, and that optionally further contains functional particles. In other words, the presently disclosed slurry composition contains the previously described particulate polymer, saturated hydrocarbon, and aqueous medium, and can optionally further contain one or more selected from the group consisting of functional particles and other components. As a result of the presently disclosed slurry composition containing the binder composition set forth above, a battery member including a functional layer formed from the slurry composition can display excellent process adhesiveness and can improve cycle characteristics of a secondary battery including the battery member.

<Binder Composition>

The presently disclosed binder composition set forth above, which contains a specific particulate polymer and saturated hydrocarbon in specific proportions in an aqueous medium, is used as the binder composition.

No specific limitations are placed on the amount of the binder composition in the slurry composition. In a case in which the slurry composition is a slurry composition for an electrode mixed material layer, for example, the amount of the binder composition can be set as an amount such that the amount of the particulate polymer is not less than 0.5 parts by mass and not more than 15 parts by mass, in terms of solid content, per 100 parts by mass of electrode active material particles. Moreover, in a case in which the slurry composition is a slurry composition for a porous membrane layer, for example, the amount of the binder composition can be set as an amount such that the amount of the particulate polymer is not less than 0.2 parts by mass and not more than 30 parts by mass, in terms of solid content, per 100 parts by mass of non-conductive particles.

<Functional Particles>

With regards to functional particles for causing a functional layer to display a desired function, electrode active material particles may be used, for example, in a case in which the functional layer is an electrode mixed material layer, and non-conductive particles may be used, for example, in a case in which the functional layer is a porous membrane layer.

[Electrode Active Material Particles]

Particles formed of known electrode active materials used in secondary batteries can be used without any specific limitations as the electrode active material particles. Specifically, examples of electrode active material particles that can be used in an electrode mixed material layer of a lithium ion secondary battery, which is one example of a secondary battery, include particles formed of any of the electrode active materials described below, but are not specifically limited thereto.

[Positive Electrode Active Material]

Examples of positive electrode active materials that can be compounded in a positive electrode mixed material layer of a positive electrode in a lithium ion secondary battery include transition metal-containing compounds such as transition metal oxides, transition metal sulfides, and complex metal oxides of lithium and transition metals. Examples of transition metals include Ti, V, Cr, Mn, Fe, Co, Ni, Cu, and Mo.

Specific examples of positive electrode active materials include, but are not specifically limited to, lithium-containing cobalt oxide ($LiCoO_2$), lithium manganate ($LiMn_2O_4$), lithium-containing nickel oxide ($LiNiO_2$), a lithium-containing complex oxide of Co—Ni—Mn, a lithium-containing complex oxide of Ni—Mn—Al, a lithium-containing complex oxide of Ni—Co—Al, olivine-type lithium iron phosphate ($LiFePO_4$), olivine-type lithium manganese phosphate ($LiMnPO_4$), lithium-rich spinel compounds represented by $Li_{1+x}Mn_{2-x}O_4$ ($0<x<2$), $Li[Ni_{0.17}Li_{0.2}Co_{0.07}Mn_{0.56}]O_2$, and $LiNi_{0.5}Mn_{1.5}O_4$.

One of the positive electrode active materials described above may be used individually, or two or more of the positive electrode active materials described above may be used in combination.

[Negative Electrode Active Material]

Examples of negative electrode active materials that can be compounded in a negative electrode mixed material layer of a negative electrode in a lithium ion secondary battery include carbon-based negative electrode active materials, metal-based negative electrode active materials, and negative electrode active materials that are a combination thereof.

Herein, "carbon-based negative electrode active material" refers to an active material having a main framework of carbon into which lithium can be inserted (also referred to as "doping"). Specific examples of carbon-based negative electrode active materials include carbonaceous materials such as coke, mesocarbon microbeads (MCMB), mesophase pitch-based carbon fiber, pyrolytic vapor-grown carbon fiber, pyrolyzed phenolic resin, polyacrylonitrile-based carbon fiber, quasi-isotropic carbon, pyrolyzed furfuryl alcohol resin (PFA), and hard carbon, and graphitic materials such as natural graphite and artificial graphite.

A metal-based negative electrode active material is an active material that contains metal, the structure of which usually contains an element that allows insertion of lithium, and that has a theoretical electric capacity per unit mass of 500 mAh/g or more when lithium is inserted. Examples of metal-based active materials include lithium metal, simple substances of metals that can form a lithium alloy (for example, Ag, Al, Ba, Bi, Cu, Ga, Ge, In, Ni, P, Pb, Sb, Si, Sn, Sr, Zn, and Ti), and oxides, sulfides, nitrides, silicides, carbides, and phosphides thereof. Moreover, oxides such as lithium titanate can be used.

One of the negative electrode active materials described above may be used individually, or two or more of the negative electrode active materials described above may be used in combination.

[Non-Conductive Particles]

Examples of non-conductive particles that can be compounded in a porous membrane layer include, without any specific limitations, known non-conductive particles that are used in secondary batteries.

Specifically, although both inorganic fine particles and organic fine particles (excluding those corresponding to a binder such as the previously described particulate polymer) can be used as non-conductive particles, inorganic fine particles are normally used. The material of the non-conductive particles is preferably an electrochemically stable material that is present stably in the environment of use of a secondary battery. Examples of materials of the non-conductive particles that are preferable from the viewpoint set forth above include particles of oxides such as aluminum oxide (alumina), hydrous aluminum oxide (boehmite), silicon oxide, magnesium oxide (magnesia), calcium oxide, titanium oxide (titania), $BaTiO_3$, ZrO, and alumina-silica complex oxide; particles of nitrides such as aluminum nitride and boron nitride; particles of covalently bonded crystals such as silicon and diamond; particles of sparingly soluble ionic crystals such as barium sulfate, calcium fluoride, and barium fluoride; and fine particles of clays such as talc and montmorillonite. These particles may be subjected to element substitution, surface treatment, solid solution treatment, and/or the like as necessary.

One of the types of non-conductive particles described above may be used individually, or two or more of the types of non-conductive particles described above may be used in combination.

<Other Components>

Examples of other components that can be compounded in the slurry composition include, but are not specifically limited to, the same other components as can be compounded in the presently disclosed binder composition and also, in a case in which the slurry composition is a slurry composition for an electrode mixed material layer, conductive materials that can be compounded in electrode mixed material layers. One other component may be used individually, or two or more other components may be used in combination in a freely selected ratio.

<Production of Slurry Composition>

No specific limitations are placed on the method by which the slurry composition is produced.

In a case in which the slurry composition is a slurry composition for an electrode mixed material layer, for example, the slurry composition can be produced by mixing the binder composition, electrode active material particles, and other components that are used as necessary, in the presence of an aqueous medium.

Moreover, in a case in which the slurry composition is a slurry composition for a porous membrane layer, for example, the slurry composition can be produced by mixing the binder composition, non-conductive particles, and other components that are used as necessary, in the presence of an aqueous medium.

Furthermore, in a case in which the slurry composition is a slurry composition for an adhesive layer, for example, the binder composition can be used as the slurry composition, the binder composition can be diluted with an aqueous medium and then used as the slurry composition, or the slurry composition can be produced by mixing the binder composition and other components that are used as necessary, in the presence of an aqueous medium.

Note that the aqueous medium used in production of the slurry composition includes the aqueous medium that was contained in the binder composition. The method of mixing is not specifically limited, and the mixing can be performed using a typically used stirrer or disperser.

(Functional Layer for Non-Aqueous Secondary Battery)

The presently disclosed functional layer is a layer having a function such as giving and receiving electrons, reinforcement, or adhesion inside a secondary battery. For example, the functional layer may be an electrode mixed material layer that gives and receives electrons through electrochemical reactions, a porous membrane layer that improves heat resistance and strength of a battery member, or an adhesive layer that improves adhesiveness of a battery member.

Moreover, the presently disclosed functional layer is a layer that is formed from the presently disclosed slurry composition set forth above, and can be formed by, for example, applying the slurry composition set forth above onto the surface of a suitable substrate to form a coating film, and subsequently drying the coating film that is formed. In other words, the presently disclosed functional layer is formed of a dried product of the slurry composition set forth above, normally contains a component derived from the previously described particulate polymer, and can optionally further contain one or more selected from the group consisting of functional particles and other components. Note that components contained in the functional layer are components that were contained in the slurry composition. Although the particulate polymer is in a particulate form in the slurry composition, the particulate polymer may be in a particulate form or in any other form in the functional layer formed using the slurry composition.

As a result of the presently disclosed functional layer being formed from the presently disclosed slurry composition containing the presently disclosed binder composition, the presently disclosed functional layer can cause a battery member that includes the functional layer to display excellent process adhesiveness and can improve cycle characteristics of a secondary battery that includes the battery member.

<Substrate>

No limitations are placed on the substrate onto which the slurry composition is applied. For example, a coating film of the slurry composition may be formed on the surface of a releasable substrate, the coating film may be dried to form a functional layer, and then the releasable substrate may be peeled from the functional layer. The functional layer that is peeled from the releasable substrate in this manner can be used as a free-standing film in formation of a battery member of a secondary battery.

However, it is preferable that a current collector, a separator substrate, or an electrode substrate is used as the substrate from a viewpoint of raising battery member production efficiency since a step of peeling the functional layer can be omitted. Specifically, the slurry composition is preferably applied onto a current collector serving as a substrate when an electrode mixed material layer is to be produced. Moreover, the slurry composition is preferably applied onto a separator substrate or an electrode substrate when a porous membrane layer or an adhesive layer is to be produced.

[Current Collector]

The current collector is a material having electrical conductivity and electrochemical durability. Specifically, the current collector may be made of, for example, iron, copper, aluminum, nickel, stainless steel, titanium, tantalum, gold, or platinum. Of these materials, copper foil is particularly preferable as a current collector used for a negative electrode. On the other hand, aluminum foil is particularly preferable as a current collector used for a positive electrode. One of these materials may be used individually, or two or more of these materials may be used in combination in a freely selected ratio.

[Separator Substrate]

The separator substrate is not specifically limited and may be a known separator substrate such as an organic separator substrate. The organic separator substrate is a porous member that is made of an organic material. The organic separator substrate may, for example, be a microporous membrane or non-woven fabric containing a polyolefin resin such as polyethylene or polypropylene, an aromatic polyamide resin, or the like. In particular, a microporous membrane or non-woven fabric made from polyethylene is preferable due to having excellent strength.

[Electrode Substrate]

The electrode substrate (positive electrode substrate or negative electrode substrate) is not specifically limited and may be an electrode substrate including an electrode mixed material layer that contains electrode active material particles and a binder and that is formed on the current collector described above.

Known electrode active material particles and binders can be used without any specific limitations as the electrode active material particles and the binder contained in the electrode mixed material layer of the electrode substrate. Moreover, the presently disclosed functional layer (electrode mixed material layer formed from a slurry composition containing electrode active material particles, a specific particulate polymer, a saturated hydrocarbon, and an aqueous medium) can be used as the electrode mixed material layer of the electrode substrate.

<Formation Method of Functional Layer>

Examples of methods by which the functional layer may be formed on a substrate such as the current collector, the separator substrate, or the electrode substrate described above include:

(1) a method in which the presently disclosed slurry composition is applied onto the surface of the substrate (surface at the electrode mixed material layer side in the case of an electrode substrate; same applies below) and is then dried;

(2) a method in which the substrate is immersed in the presently disclosed slurry composition and is then dried; and (3) a method in which the presently disclosed slurry composition is applied onto a releasable substrate and is dried to produce a functional layer that is then transferred onto the surface of the substrate.

Of these methods, method (1) is particularly preferable since it allows simple control of the thickness of the functional layer. In more detail, method (1) includes a step of applying the slurry composition onto a substrate (application step) and a step of drying the slurry composition that has been applied onto the substrate to form a functional layer (functional layer formation step).

[Application Step]

Examples of methods by which the slurry composition can be applied onto the substrate in the application step include, but are not specifically limited to, doctor blading, reverse roll coating, direct roll coating, gravure coating, extrusion coating, and brush coating.

[Functional Layer Formation Step]

The method by which the slurry composition on the substrate is dried in the functional layer formation step is not specifically limited and may be a commonly known method. Examples of drying methods that can be used include drying by warm, hot, or low-humidity air, drying in a vacuum, and drying by irradiation with infrared light, electron beams, or the like.

In a case in which the functional layer is an electrode mixed material layer, a pressing process is preferably performed by roll pressing or the like after drying. The pressing process can further increase the density of the obtained electrode mixed material layer.

(Battery Member for Non-Aqueous Secondary Battery)

The presently disclosed battery member is a separator or an electrode, for example, and normally includes the presently disclosed functional layer set forth above on a current collector, separator substrate, or electrode substrate such as previously described. The presently disclosed battery member has excellent process adhesiveness as a result of including the presently disclosed functional layer. Moreover, by using the presently disclosed battery member, a secondary battery having excellent battery characteristics such as cycle characteristics can be well produced.

So long as the presently disclosed battery member is a battery member that is provided with the presently disclosed functional layer, the presently disclosed battery member may include constituent elements other than the presently disclosed functional layer set forth above and a substrate. Examples of such constituent elements include, but are not specifically limited to, electrode mixed material layers, porous membrane layers, and adhesive layers that do not correspond to the presently disclosed functional layer.

Moreover, the battery member may include more than one type of the presently disclosed functional layer. For example, an electrode may include an electrode mixed material layer formed from a presently disclosed slurry composition for an electrode mixed material layer on a current collector and may also include a porous membrane layer and/or adhesive layer formed from a presently disclosed slurry composition for a porous membrane layer and/or slurry composition for an adhesive layer on the electrode mixed material layer. In another example, a separator may include a porous membrane layer formed from a presently disclosed slurry composition for a porous membrane layer on a separator substrate and may also include an adhesive layer formed from a presently disclosed slurry composition for an adhesive layer on the porous membrane layer.

Note that it is preferable that the presently disclosed functional layer constitutes at least one surface (surface that is affixed to another battery member) of the battery member that includes the presently disclosed functional layer.

(Non-Aqueous Secondary Battery)

The presently disclosed secondary battery includes the presently disclosed battery member set forth above. More specifically, the presently disclosed secondary battery includes a positive electrode, a negative electrode, a separator, and an electrolyte solution, and includes the presently disclosed functional layer in at least one battery member among the positive electrode, the negative electrode, and the separator. The presently disclosed secondary battery can display excellent battery characteristics as a result of the presently disclosed battery member being used therein.

<Positive Electrode, Negative Electrode, and Separator>

At least one of the positive electrode, the negative electrode, and the separator used in the presently disclosed secondary battery is the presently disclosed battery member set forth above. Note that known positive electrodes, negative electrodes, and separators can be used without any specific limitations as a positive electrode, negative electrode, or separator other than the presently disclosed battery member (i.e., a positive electrode, negative electrode, or separator that does not include the presently disclosed functional layer).

<Electrolyte Solution>

The electrolyte solution is normally an organic electrolyte solution obtained by dissolving a supporting electrolyte in an organic solvent. The supporting electrolyte may, for example, be a lithium salt in the case of a lithium ion secondary battery. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable as they readily dissolve in solvents and exhibit a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of suitable organic solvents in the case of a lithium ion secondary battery include carbonates such as dimethyl carbonate (DMC), ethylene carbonate (EC), diethyl carbonate (DEC), propylene carbonate (PC), butylene carbonate (BC), ethyl methyl carbonate (EMC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of these solvents may be used. Of these solvents, carbonates are preferable due to having high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

<Production Method of Non-Aqueous Secondary Battery>

The presently disclosed secondary battery set forth above can be produced by, for example, stacking the positive electrode and the negative electrode with the separator in-between, performing rolling, folding, or the like of the resultant laminate as necessary after optionally pressing the laminate, placing the laminate in a battery container, injecting the electrolyte solution into the battery container, and sealing the battery container. At least one battery member among the positive electrode, the negative electrode, and the separator is the presently disclosed battery member including the presently disclosed functional layer. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may, for example, be a coin type, a button type, a sheet type, a cylinder type, a prismatic type, or a flat type.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through polymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer.

In the examples and comparative examples, the surface acid content and crystallization time of a particulate polymer, the amount of a saturated hydrocarbon in a binder composition, the handleability and process adhesiveness of a battery member, and the cycle characteristics of a secondary battery were evaluated by the following methods.

<Surface Acid Content>

With respect to an obtained water dispersion of a particulate polymer, components having a particle diameter of 1 μm or more were separated by centrifugal separation, and then coarse particles were separated using a hydrophilic filter having a pore size of 3.00 μm. Next, the obtained water dispersion of the particulate polymer was diluted with 0.3% dodecylbenzenesulfonic acid aqueous solution and was adjusted to a solid content concentration of 10%. Thereafter, centrifugal separation was performed for 30 minutes at 7,000 G to collect light liquid. The obtained light liquid was diluted with 0.3% dodecylbenzenesulfonic acid aqueous solution and was adjusted to a solid content concentration of 10%. Thereafter, centrifugal separation was performed for 30 minutes at 7,000 G to collect light liquid. The obtained light liquid was diluted with 0.3% dodecylbenzenesulfonic acid aqueous solution and was adjusted to a solid content concentration of 10%. Thereafter, centrifugal separation of the adjusted sample was performed for 30 minutes at 7,000 G to collect light liquid. The obtained light liquid was adjusted to pH 12.0 with 5% sodium hydroxide aqueous solution. The pH adjusted sample, in an amount of 3.0 g in terms of solid content, was collected in a 100 mL beaker, and then 3 g of an aqueous solution of EMULGEN 120 (produced by Kao Corporation) diluted to 0.2% and 1 g of an aqueous solution of SM5512 (produced by Dow Corning Toray Co., Ltd.) diluted to 1% were added thereto. These materials were uniformly stirred by a stirrer while 0.1 N hydrochloric acid aqueous solution was added thereto at a rate of 0.5 mL/30 s and while electrical conductivity was measured at intervals of 30 seconds.

The obtained electrical conductivity data was plotted as a graph with electrical conductivity on a vertical axis (Y coordinate axis) and cumulative amount of added hydrochloric acid on a horizontal axis (X coordinate axis). In this manner, a hydrochloric acid amount-electrical conductivity curve with three inflection points was obtained. The X coordinates of the three inflection points were denoted as P1, P2, and P3 in order from the smallest value. Linear approximations L1, L2, and L3 were determined by the least squares method for data in three sections corresponding to X coordinates of: zero to coordinate P1; coordinate P1 to coordinate P2; and coordinate P2 to coordinate P3. An X coordinate of an intersection point of the linear approximation L1 and the linear approximation L2 was taken to be A1, and an X coordinate of an intersection point of the linear approximation L2 and the linear approximation L3 was taken to be A2.

The surface acid content per 1 g of the particulate polymer was determined as a hydrochloric acid-equivalent value (mmol/g) from the following formula (a).

$$\text{Surface acid content per 1 g of particulate polymer} = (A2 - A1)/3.0 \text{ g} \qquad (a)$$

<Crystallization Time>

First, 2 g of an obtained water dispersion of a particulate polymer was supplied onto an unglazed plate, and absorption of water was allowed to occur to separate solid content. The solid content was dried at 40° C. for 1 hour to obtain a measurement sample.

A differential scanning calorimeter (Diamond DSC produced by PerkinElmer Inc.) was used to perform exothermic peak measurement under conditions of a heating/cooling rate of 20° C./min in a stream of nitrogen. The peak temperature of an exothermic peak attributed to a block region formed of an aromatic vinyl monomer unit in a first scan was taken to be the heating crystallization temperature.

In addition, 6 mg to 10 mg of the measurement sample was sealed in an aluminum pan of the differential scanning calorimeter, was heated to 250° C. at a heating rate of 10° C./min, was cooled to a temperature 50° C. lower than the heating crystallization temperature at a cooling rate of 20° C./min, was held at that temperature for at least 5 minutes, and was finally heated to a temperature 10° C. lower than the heating crystallization temperature at a heating rate of 10° C./min, and the time until an endothermic peak temperature was observed was taken to be the crystallization time. The crystallization time was evaluated in accordance with the following standard. A longer crystallization time indicates that the block copolymer forming the particulate polymer crystallizes less readily.

A: Crystallization time of 3 hours or more
B: Crystallization time of not less than 1 hour and less than 3 hours
C: Crystallization time of less than 1 hour <Amount of Saturated Hydrocarbon>

The amount of a saturated hydrocarbon (amount of cyclohexane and/or amount of n-pentane) in a binder composition was measured using a capillary gas chromatograph (GC-2010 Plus produced by Shimadzu Corporation) with toluene as an internal standard.

Specifically, 30 mL of 4% potassium oleate aqueous solution and 5 g of a measurement sample were precisely weighed into an Erlenmeyer flask equipped with a stopper. A stirring bar was placed in the flask and stirring was performed for at least 5 minutes using a stirrer. Next, 1 mL of the stirred measurement sample was loaded into a 1.5 mL vial container, and a lid of the vial container was closed. In addition, 3 mL of 4% potassium oleate aqueous solution was loaded into a 4 mL vial container for a washing liquid, and a lid of the vial container was closed. A microsyringe was used to inject 2 µmL of the measurement sample into the capillary gas chromatograph, and measurement was performed under conditions of an initial temperature of 80° C., an end temperature of 260° C., a heating rate of 10° C./min, an equilibrium time of 3 minutes, a holding time of 22 minutes, a total time of 40 minutes, and a carrier gas of nitrogen.

<Handleability>

An obtained negative electrode web was continuously pressed at a pressing rate of 15 m/s using a roll press of 500 mm in diameter such that the density of the negative electrode mixed material layer after pressing was 1.75 g/cm³. In this continuous pressing, a visual confirmation was made as to whether adhered matter originating from the negative electrode mixed material layer became adhered to the surface of a roll of the roll press, and an evaluation was made by the following standard. When adhesion of adhered matter to the roll surface occurs less readily, this indicates that the negative electrode has better handleability.

A: Adhered matter not observed on roll surface even after 800 m of continuous pressing
B: Adhered matter observed on roll surface after not less than 500 m and less than 800 m of continuous pressing
C: Adhered matter observed on roll surface after more than 0 m and less than 500 m or continuous pressing <Process Adhesiveness>

Process adhesiveness of a negative electrode and a separator through a negative electrode mixed material layer was evaluated by measuring the peel strength as described below.

First, the negative electrode and the separator were each cut to 50 mm in length and 10 mm in width. The cut negative electrode and separator were then stacked with the negative electrode mixed material layer in-between. The resultant laminate was pressed by a flat plate press with a temperature of 70° C. and a load of 5 kN/m to obtain a test specimen.

The test specimen was placed with the surface at the current collector-side of the negative electrode facing downward, and cellophane tape (tape prescribed by HS Z1522) was affixed to the surface at the current collector-side of the negative electrode. Note that the cellophane tape was secured to a horizontal test stage in advance. The stress when the separator was peeled off by pulling one end of the separator vertically upward at a pulling speed of 50 mm/min was measured within 30 minutes. This measurement was made three times, an average value for the three measured stresses was determined as the peel strength (N/m), and process adhesiveness of the negative electrode and the separator through the negative electrode mixed material layer was evaluated by the following standard. A larger peel strength indicates better process adhesiveness.

A: Peel strength of 2.5 N/m or more
B: Peel strength of not less than 2 N/m and less than 2.5 N/m
C: Peel strength of not less than 1 N/m and less than 2 N/m
D: Peel strength of less than 1 N/m <Cycle Characteristics>

A produced laminate cell-type lithium ion secondary battery was left at rest in a 25° C. environment for 5 hours and was then subjected to a charge/discharge operation to 4.2 V at a charge rate of 1C and to 3.0 V at a discharge rate of 1C in a 25° C. environment. The initial capacity C0 was measured. Charging and discharging were repeated in the same manner in a 45° C. environment, and the capacity C3 after 100 cycles was measured. The rate of capacity change $\Delta C$ (=(C3/C0)×100(%)) was calculated, and cycle characteristics were evaluated by the following standard. A higher value for the rate of capacity change $\Delta C$ indicates better cycle characteristics.

A: $\Delta C$ of 86% or more
B: $\Delta C$ of not less than 80% and less than 86%
C: $\Delta C$ of not less than 75% and less than 80%
D: $\Delta C$ of less than 75%

Example 1

<Production of Binder Composition for Non-Aqueous Secondary Battery Negative Electrode>
[Production of Cyclohexane Solution of Block Copolymer]

A pressure-resistant reactor was charged with 233.3 kg of cyclohexane, 54.2 mmol of N,N,N',N'-tetramethylethylenediamine (TMEDA), and 25.0 kg of styrene as an aromatic vinyl monomer. These materials were stirred at 40° C. while 1806.5 mmol of n-butyllithium was added thereto as a polymerization initiator, and were heated to 50° C. while polymerization was carried out for 1 hour. The polymerization conversion rate of styrene was 100%. Next, temperature control was performed to maintain a temperature of 50° C. to 60° C. while continuously adding 75.0 kg of isoprene into the pressure-resistant reactor over 1 hour as an aliphatic conjugated diene monomer. The polymerization reaction was continued for 1 hour after completing addition of the isoprene. The polymerization conversion rate of isoprene was 100%. Next, 740.6 mmol of dichlorodimethylsilane was added into the pressure-resistant reactor as a coupling agent and a coupling reaction was performed for 2 hours. Thereafter, 3612.9 mmol of methanol was added to the reaction liquid and was thoroughly mixed therewith to deactivate active terminals. Next, 0.3 parts of 2,6-di-tert-butyl-p-cresol as an antioxidant was added to 100 parts of the reaction liquid (containing 30.0 parts of polymer component) and was mixed therewith. The resultant mixed solution was gradually dripped into hot water of 85° C. to 95° C. so as to volatilize the solvent and obtain a precipitate. This precipitate was pulverized and was then hot-air dried at 85° C. to collect a dried product containing a block copolymer.

The dried product that was collected was then dissolved in cyclohexane to produce a block copolymer solution in which the concentration of the block copolymer was 25%.
[Emulsification]

A mixture obtained by mixing sodium alkylbenzene sulfonate, sodium polyoxyethylene alkyl sulfosuccinate, and sodium polyoxyethylene alkyl ether sulfate in a ratio of 1:1:1 (by mass) was dissolved in deionized water to produce a 5% aqueous solution.

A tank was charged with 500 g of the obtained block copolymer solution and 500 g of the obtained aqueous solution, and preliminary mixing of these materials was performed by stirring. Next, a metering pump was used to transfer the preliminary mixture from the tank to a continuous high-performance emulsifying and dispersing device (produced by Pacific Machinery & Engineering Co., Ltd.; product name: Milder MDN303V) at a rate of 100 g/min, and the preliminary mixture was stirred at a rotation speed of 15,000 rpm to cause emulsification of the preliminary mixture and obtain an emulsion.

Some of the cyclohexane in the obtained emulsion was subsequently vacuum evaporated in a rotary evaporator (5 hours at 70° C.). Thereafter, the emulsion from which some of the cyclohexane had been evaporated was left to separate for 1 day in a chromatographic column equipped with a stop-cock, and the lower layer portion after separation was removed to perform concentration.

Finally, the upper layer portion was filtered through a 100-mesh screen to obtain a water dispersion (block copolymer latex) containing a particulate block copolymer.
[Graft Polymerization and Cross-Linking]

After adding 675 parts of deionized water into a polymerization reactor equipped with a stirrer, 20 parts of methacrylic acid was added thereto. Stirring was performed by an impeller of the polymerization reactor while 100 parts (in terms of block copolymer) of the obtained block copolymer latex was added into the polymerization reactor, and nitrogen purging of the polymerization reactor was performed. The diluted block copolymer latex was then heated to a temperature of 30° C. under stirring.

A separate vessel was used to produce a solution containing 7 parts of distilled water, and 0.01 parts of ferrous sulfate (produced by Chubu Chelest Co., Ltd.; product name: Frost Fe) and 0.32 parts of sodium formaldehyde sulfoxylate (produced by Sumitomo Seika Chemicals Co., Ltd.; product name: SFS) as reducing agents. After adding the obtained solution into the polymerization reactor, 0.35 parts of tert-butyl hydroperoxide (produced by NOF Corporation; product name: PERBUTYL H) was added as an oxidizing agent, and a reaction was carried out at 30° C. for 1 hour and then at 70° C. for 2 hours. The polymerization conversion rate was 99%.

This yielded a water dispersion (binder composition) of a particulate polymer formed of a block copolymer that was obtained through graft polymerization and cross-linking of a block copolymer.

The obtained water dispersion of the particulate polymer was used to measure the crystallization time of the block copolymer forming the particulate polymer, the surface acid content of the particulate polymer, and the amount of a saturated hydrocarbon in the binder composition. The results are shown in Table 1.
<Production of Slurry Composition for Non-Aqueous Secondary Battery Negative Electrode>

A mixture was obtained by adding 100 parts of artificial graphite (capacity: 360 mAh/g) as a negative electrode active material, 1 part of carbon black (produced by TIMCAL; product name: Super C65) as a conductive material, and 1.2 parts in terms of solid content of a 2% aqueous solution of carboxymethyl cellulose (produced by Nippon Paper Industries Co., Ltd.; product name: MAC-350HC) as a thickener into a planetary mixer equipped with a disper blade. The resultant mixture was adjusted to a solid content concentration of 60% with deionized water and was subsequently mixed at 25° C. for 60 minutes. Next, the mixture was adjusted to a solid content concentration of 52% with deionized water and was then further mixed at 25° C. for 15 minutes to obtain a mixed liquid. Deionized water and 2.0 parts in terms of solid content of a binder composition composed of the water dispersion produced as described above were added to the obtained mixed liquid, and the final solid content concentration was adjusted to 48%. Further mixing was performed for 10 minutes, and then a defoaming process was carried out under reduced pressure to yield a slurry composition for a negative electrode having good fluidity.
<Formation of Negative Electrode>

The obtained slurry composition for a negative electrode was applied onto copper foil (current collector) of 15 μm in thickness by a comma coater such as to have a coating weight after drying of 11 mg/cm$^2$. The applied slurry composition was dried by conveying the copper foil inside a 60° C. oven for 2 minutes at a speed of 0.5 m/min. Thereafter, 2 minutes of heat treatment was performed at 120° C. to obtain a negative electrode web.

The negative electrode web was rolled by roll pressing to obtain a negative electrode having a negative electrode mixed material layer density of 1.75 g/cm$^3$.

Handleability and process adhesiveness of the negative electrode as a battery member were evaluated. The results are shown in Table 1.

<Formation of Positive Electrode>

A slurry composition for a positive electrode was obtained by combining 100 parts of $LiCoO_2$ having a median diameter of 12 μm as a positive electrode active material, 2 parts of acetylene black (produced by Denka Company Limited; product name: HS-100) as a conductive material, 2 parts in terms of solid content of polyvinylidene fluoride (produced by Kureha Corporation; product name: #7208) as a binder, and N-methylpyrrolidone as a solvent such that the total solid content concentration was 70%, and mixing these materials using a planetary mixer.

The obtained slurry composition for a positive electrode was applied onto aluminum foil (current collector) of 20 μm in thickness by a comma coater such as to have a coating weight after drying of 23 mg/cm². The applied slurry composition was dried by conveying the aluminum foil inside a 60° C. oven for 2 minutes at a speed of 0.5 m/min. Thereafter, 2 minutes of heat treatment was performed at 120° C. to obtain a positive electrode web.

The positive electrode web was rolled by roll pressing to obtain a positive electrode having a positive electrode mixed material layer density of 4.0 g/cm³.

<Preparation of Separator>

A separator made from a single layer of polypropylene of 20 μm in thickness (produced by Celgard, LLC.; product name: Celgard 2500) was prepared as a separator composed of a separator substrate.

<Production of Lithium Ion Secondary Battery (Laminate Type)>

A laminate was obtained by stacking the produced positive and negative electrodes and the prepared separator in an order of positive electrode/separator/negative electrode with the electrode mixed material layers facing toward the separator. The obtained laminate was then wound around a core of 20 mm in diameter to obtain a roll including the positive electrode, the separator, and the negative electrode. Next, the obtained roll was compressed to a thickness of 4.5 mm from one direction at a rate of 10 mm/s to obtain a flattened product. Note that the flattened product that was obtained had an elliptical shape in plan view, and the ratio of the major axis to the minor axis (major axis/minor axis) was 7.7.

A non-aqueous electrolyte solution (LiPF6 solution of 1.0 M in concentration; solvent: mixed solvent of ethylene carbonate (EC)/ethyl methyl carbonate (EMC)=3/7 (mass ratio) having 2 volume % of vinylene carbonate (VC) added as an additive) was prepared.

Next, the flattened product was housed in a laminate case made from aluminum with the non-aqueous electrolyte solution. After connecting a negative electrode lead and a positive electrode lead at specific locations, an opening of the laminate case was sealed by heat to thereby produce a laminate-type lithium ion secondary battery as a non-aqueous secondary battery. The obtained secondary battery had a pouch shape of 35 mm (width)×48 mm (height)×5 mm (thickness) and a nominal capacity of 700 mAh.

Cycle characteristics of the lithium ion secondary battery were evaluated. The result is shown in Table 1.

Examples 2 to 4

A binder composition for a negative electrode, a slurry composition for a negative electrode, a negative electrode, a positive electrode, a separator, and a secondary battery were produced or prepared in the same way as in Example 1 with the exception that, in emulsification of the block copolymer solution, the conditions during vacuum evaporation of some of the cyclohexane in the obtained emulsion using a rotary evaporator were changed to 10 hours at 70° C. (Example 2), 3.5 hours at 70° C. (Example 3), or 2 hours at 70° C. (Example 4). Evaluations were conducted in the same manner as in Example 1. The results are shown in Table 1.

Example 5

A binder composition for a negative electrode, a slurry composition for a negative electrode, a negative electrode, a positive electrode, a separator, and a secondary battery were produced or prepared in the same way as in Example 1 with the exception that, in production of the dried product of the block copolymer, a mixture of cyclohexane and n-pentane (cyclohexane:n-pentane (mass ratio)=70:30) was added into the pressure-resistant reactor instead of cyclohexane, in emulsification of the block copolymer solution, the conditions during vacuum evaporation of cyclohexane in the obtained emulsion using a rotary evaporator were changed to 25 hours at 95° C., and the binder composition was obtained by adding 0.02 parts of cyclohexane to 100 parts in terms of solid content of the water dispersion obtained after graft polymerization and cross-linking of the block copolymer and mixing the cyclohexane therewith for 3 hours. Evaluations were conducted in the same manner as in Example 1. The results are shown in Table 1.

Example 6

A binder composition for a negative electrode, a slurry composition for a negative electrode, a negative electrode, a positive electrode, a separator, and a secondary battery were produced or prepared in the same way as in Example 1 with the exception that, in production of the dried product of the block copolymer, a mixture of cyclohexane and n-pentane (cyclohexane:n-pentane (mass ratio)=70:30) was added into the pressure-resistant reactor instead of cyclohexane, in production of the block copolymer solution, the dried product that was collected was dissolved in a mixture of cyclohexane and n-pentane (cyclohexane:n-pentane (mass ratio)=70:30), and, in emulsification of the block copolymer solution, the conditions during vacuum evaporation of some of the cyclohexane and n-pentane in the obtained emulsion using a rotary evaporator were changed to 3.5 hours at 70° C. Evaluations were conducted in the same manner as in Example 1. The results are shown in Table 1.

Example 7

A binder composition for a negative electrode, a slurry composition for a negative electrode, a negative electrode, a positive electrode, a separator, and a secondary battery were produced or prepared in the same way as in Example 1 with the exception that the binder composition for a non-aqueous secondary battery negative electrode was produced by loading a water dispersion of a particulate polymer produced in the same way as in Example 1 and a water dispersion of a particulate binder produced by a method described below into a vessel such that, in terms of solid content, 1.4 parts of the particulate polymer and 0.6 parts of the particulate binder (particulate polymer:particulate binder (mass ratio)=70:30) were loaded into the vessel, and then performing stirring for 1 hour using a stirrer (produced by SHINTO Scientific Co., Ltd.; product name: Three-One Motor).

Evaluations were conducted in the same manner as in Example 1. The results are shown in Table 1.

<Production of Water Dispersion of Particulate Binder>

A vessel A was charged with a mixture of 33 parts of 1,3-butadiene as an aliphatic conjugated diene monomer, 62 parts of styrene as an aromatic vinyl monomer, 4 parts of itaconic acid as a carboxyl group-containing monomer, 0.3 parts of tert-dodecyl mercaptan as a chain transfer agent, and 0.3 parts of sodium lauryl sulfate as an emulsifier. Addition of the mixture to a pressure-resistant vessel B from the vessel A was started, and, simultaneously thereto, addition of 1 part of potassium persulfate to the pressure-resistant vessel B as a polymerization initiator was started to initiate polymerization. A reaction temperature of 75° C. was maintained.

Once 4 hours had passed from the start of polymerization (once 70% of the mixture had been added into the pressure-resistant vessel B), 1 part of 2-hydroxyethyl acrylate was added into the pressure-resistant vessel B as a hydroxy group-containing monomer over 1 hour and 30 minutes.

Addition of the total amount of the above-described monomers was completed 5 hours and 30 minutes after the start of polymerization. Heating was subsequently performed to 85° C. and a reaction was carried out for 6 hours.

Once the polymerization conversion rate reached 97%, cooling was performed to quench the reaction to yield a mixture containing a particulate binder. The mixture containing the particulate binder was adjusted to pH 8 through addition of 5% sodium hydroxide aqueous solution. Thereafter, unreacted monomer was removed by thermal-vacuum distillation. Cooling was then performed to obtain a water dispersion (solid content concentration: 40%) containing a particulate binder having a median diameter of 0.15 μm.

Example 8

A binder composition for a negative electrode, a slurry composition for a negative electrode, a negative electrode, a positive electrode, a separator, and a secondary battery were produced or prepared in the same way as in Example 1 with the exception that, in production of the binder composition for a non-aqueous secondary battery negative electrode, the block copolymer latex (water dispersion containing a particulate block copolymer) was used in that form as the binder composition for a non-aqueous secondary battery negative electrode without performing graft polymerization and cross-linking of the block copolymer latex. Evaluations were conducted in the same manner as in Example 1. The results are shown in Table 1.

Comparative Examples 1 and 2

A binder composition for a negative electrode, a slurry composition for a negative electrode, a negative electrode, a positive electrode, a separator, and a secondary battery were produced or prepared in the same way as in Example 1 with the exception that, in emulsification of the block copolymer solution, the conditions during vacuum evaporation of cyclohexane in the obtained emulsion using a rotary evaporator were changed to 25 hours at 95° C. (Comparative Example 1) or 1 hour at 70° C. (Comparative Example 2). Evaluations were conducted in the same manner as in Example 1. The results are shown in Table 1.

TABLE 1

|  |  |  | Example 1 | Example 2 | Example 3 | Example 4 | Example 5 | Example 6 | Example 7 | Example 8 | Comparative Example 1 | Comparative Example 2 |
|---|---|---|---|---|---|---|---|---|---|---|---|---|
| Slurry composition | Functional particles | Negative electrode active material (artificial graphite) [parts by mass] | 100 | 100 | 100 | 100 | 100 | 100 | 100 | 100 | 100 | 100 |
| | Binder composition | Cyclohexane Content [parts by mass/100 parts by mass of particulate polymer] | 0.03 | 0.003 | 0.05 | 0.08 | 0.02 | 0.028 | 0.03 | 0.03 | <0.0005 | 0.12 |
| | | n-Pentane Content [parts by mass/100 parts by mass of particulate polymer] | — | — | — | — | — | 0.005 | — | — | — | — |
| | | Particulate polymer Surface acid content [mmol/g] | 0.5 | 0.5 | 0.5 | 0.5 | 0.5 | 0.5 | 0.5 | 0.0 | 0.5 | 0.5 |
| | | Amount [parts by mass] | 2.0 | 2.0 | 2.0 | 2.0 | 2.0 | 2.0 | 1.4 | 2.0 | 2.0 | 2.0 |
| | | Particulate binder Amount [parts by mass] | — | — | — | — | — | — | 0.6 | — | — | — |
| Evaluation | Crystallization time | | A | B | A | A | A | A | A | A | C | A |
| | Handleability | | A | A | B | C | A | A | A | C | C | C |
| | Process adhesiveness | | A | B | B | B | A | A | A | B | C | D |
| | Cycle characteristics | | A | B | A | A | A | B | A | B | C | D |

It can be seen from Table 1 that a negative electrode having excellent process adhesiveness and a secondary battery having excellent cycle characteristics were obtained in each of Examples 1 to 8. It can also be seen from Table 1 that the crystallization time shortened and secondary battery cycle characteristics deteriorated in Comparative Example 1 in which the amount of a saturated hydrocarbon was small, and negative electrode process adhesiveness decreased in Comparative Example 2 in which the amount of a saturated hydrocarbon was large.

INDUSTRIAL APPLICABILITY

According to the present disclosure, a binder composition for a non-aqueous secondary battery, a slurry composition for a non-aqueous secondary battery functional layer, and a functional layer for a non-aqueous secondary battery that can form a battery member for a non-aqueous secondary battery having excellent process adhesiveness and a non-aqueous secondary battery having excellent cycle characteristics are obtained.

Moreover, according to the present disclosure, a battery member for a non-aqueous secondary battery that displays excellent process adhesiveness and can form a non-aqueous secondary battery having excellent cycle characteristics is obtained.

Furthermore, according to the present disclosure, a non-aqueous secondary battery having excellent cycle characteristics is obtained.

The invention claimed is:

1. A binder composition for a non-aqueous secondary battery comprising:
    a particulate polymer formed of a block copolymer including an aliphatic conjugated diene monomer unit and a block region in which only aromatic vinyl monomer units are bonded to one another in a row as repeating units;
    at least one saturated hydrocarbon selected from the group consisting of a chain alkane having a carbon number of not less than 5 and not more than 8 and a cycloalkane having a carbon number of not less than 5 and not more than 8; and
    water, wherein
    content of the saturated hydrocarbon is not less than 0.001 parts by mass and not more than 0.1 parts by mass per 100 parts by mass of the particulate polymer.

2. The binder composition for a non-aqueous secondary battery according to claim 1, wherein the particulate polymer has a surface acid content of not less than 0.05 mmol/g and not more than 2.00 mmol/g.

3. The binder composition for a non-aqueous secondary battery according to claim 1, wherein the block copolymer further includes a coupling moiety.

4. A slurry composition for a non-aqueous secondary battery functional layer comprising the binder composition for a non-aqueous secondary battery according to claim 1.

5. The slurry composition for a non-aqueous secondary battery functional layer according to claim 4, further comprising electrode active material particles.

6. A functional layer for a non-aqueous secondary battery formed using the slurry composition for a non-aqueous secondary battery functional layer according to claim 4.

7. A battery member for a non-aqueous secondary battery comprising the functional layer for a non-aqueous secondary battery according to claim 6.

8. A non-aqueous secondary battery comprising the battery member for a non-aqueous secondary battery according to claim 7.

* * * * *